United States Patent [19]

Hess et al.

[11] 4,154,525

[45] May 15, 1979

[54] MULTIPRINT EASEL

[75] Inventors: Steven Hess, Rochester; Daniel A. Northrup, Scottsville, both of N.Y.

[73] Assignee: Saunders Photo/Graphic, Inc., Rochester, N.Y.

[21] Appl. No.: 870,868

[22] Filed: Jan. 20, 1978

[51] Int. Cl.² .............................................. G03B 27/58
[52] U.S. Cl. .................................................... 355/74
[58] Field of Search ....................... 355/32, 77, 54, 72, 355/74

[56] References Cited

U.S. PATENT DOCUMENTS

| 2,168,503 | 8/1939 | Williamson | 355/54 |
| 2,605,675 | 8/1952 | Mourfield | 355/54 |
| 2,823,581 | 2/1958 | Greenspan | 355/54 |
| 2,936,671 | 5/1960 | Saunders | 355/74 |
| 3,682,547 | 8/1972 | Ratowsky | 355/74 |
| 3,728,021 | 4/1973 | Retzyl et al. | 355/74 |

Primary Examiner—Donald A. Griffin
Attorney, Agent, or Firm—Stonebraker, Shepard & Stephens

[57] ABSTRACT

A multiprint easel has a base and a mask positioned above the base to leave room for a laterally slidable paper tray. The paper tray is movable between at least two positions, has bent-in edges that hold print paper, and has a registration pin that fits in holes in the base to locate the paper tray accurately in each print position. The back edge of the paper tray is bent up to slide along the back edge of the mask and is held in engagement with the mask by a bent-up retainer at the back edge of the base. A movable slide preferably underlies the paper tray and has a bent-down back edge that is movable forward for removing paper from the tray, and the slide preferably guides on the registration pin.

12 Claims, 5 Drawing Figures

U.S. Patent May 15, 1979 4,154,525

MULTIPRINT EASEL

BACKGROUND OF THE INVENTION

Multiprint easels for masking a sheet of photographic print paper to make several successive prints on a sheet are generally known, and many ways have been suggested for arranging standard sized prints on a sheet of print paper. Relative motion between the mask and the print paper and variation in the aperture size in the mask are required, and insertion and removal of paper and positioning and manipulating the mask are involved in using the easel.

The invention involves analysis of the requirements for multiprint easels and realization of ways that all the requirements can be met in a simple and inexpensive device that is easy, convenient, and reliable in use. The invention aims at an easel that operates accurately and quickly with simple and easy movements in dim light to insure that each print is properly placed on a sheet of print paper. The invention also seeks economy, ruggedness, and durability in an efficient multiprint easel that is satisfying to operate.

SUMMARY OF THE INVENTION

The inventive multiprint easel has a base that is normally oriented horizontally and a mask secured to the base to be parallel with and spaced above the base. The mask has a printing aperture, and the mask and the base have corresponding front, back, and opposite side edges. A print paper tray is disposed between the base and the mask and is slidable to a plurality of print positions between the side edges of the easel, and movement of the tray is guided by a back edge that is bent up to engage the back edge of the mask for aligning the tray with the mask. The back edge of the base is bent up to form a retainer parallel with and spaced from the back edge of the mask to engage and hold the back edge of the tray in engagement with the mask. The spacing of the mask above the base is sufficient relative to the tray to allow vertical movement of the front edge of the tray, and a registration pin secured to the tray and extending downward below the underside of the tray near the front edge of the easel fits into a plurality of registration holes positioned along the front edge of the base to locate the tray in predetermined print positions relative to the mask. The tray is especially configured to receive and hold a standard size sheet of print paper flat on the tray, and the tray is easily moved between print positions by lifting and laterally sliding the front edge of the tray. The tray preferably includes an ejector slide that is movable between the base and the underside of the tray and has a bent-down back end that pulls a sheet of print paper out of the tray when the slide is moved forward. The general result is easy and accurate insertion of a sheet of print paper into the tray, reliable positioning of the tray relative to the mask, and easy removal of the print paper from the tray, all in a simple and inexpensive construction.

DRAWINGS

DETAILED DESCRIPTION

Figure 1:
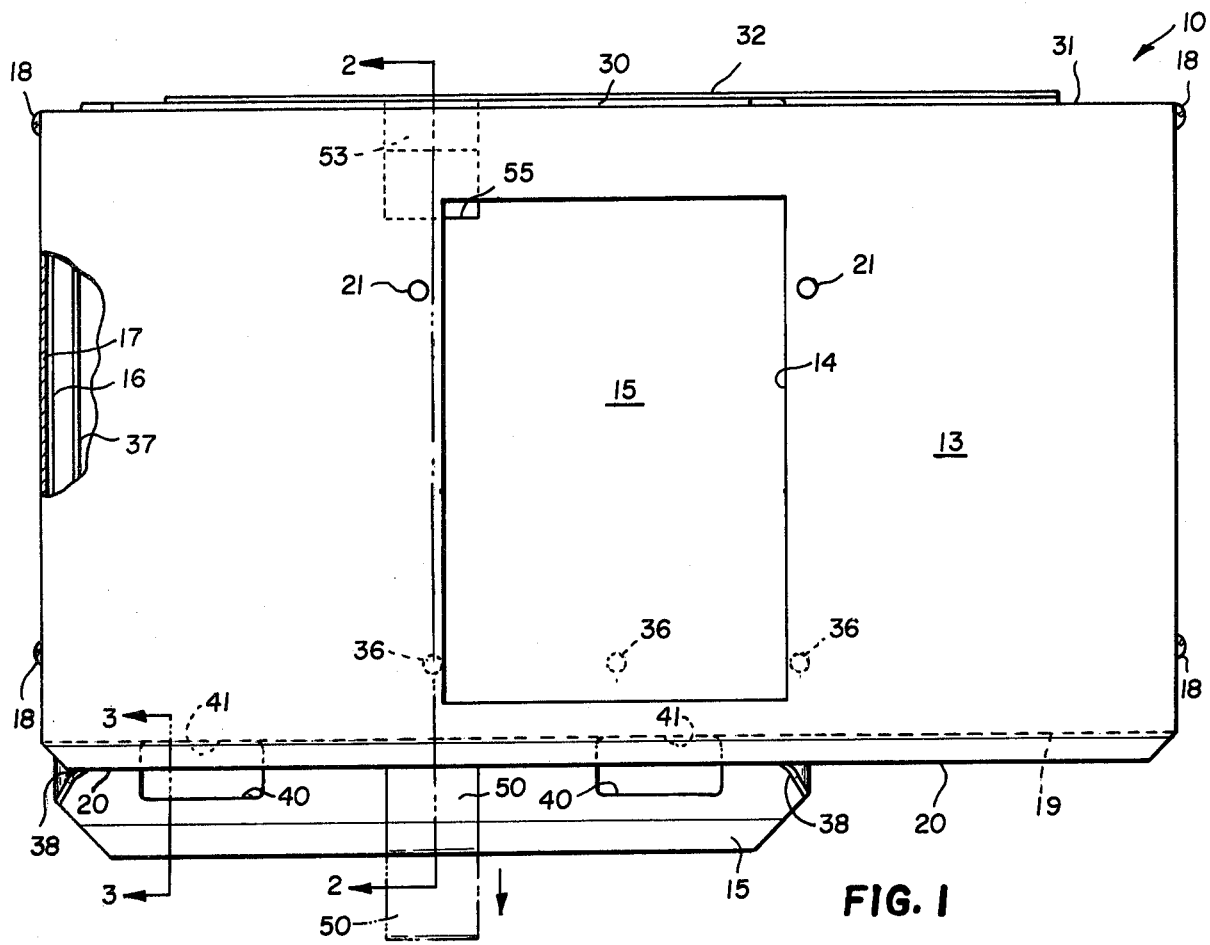
FIG. 1 is a partially cutaway plan view of a preferred embodiment of the invention easel.

The preferred embodiment of the invention easel 10 as shown in the drawings includes a base 11 supported on pads or feet 12, a mask 13 disposed over base 11, and a paper tray 15 that is slidable between base 11 and mask 13. Easel 10 and its base 11 are normally oriented horizontally so that paper tray 15 extends outward along a front edge and guides along a back edge between opposite right and left side edges as shown in FIG. 1.

Figure 2:
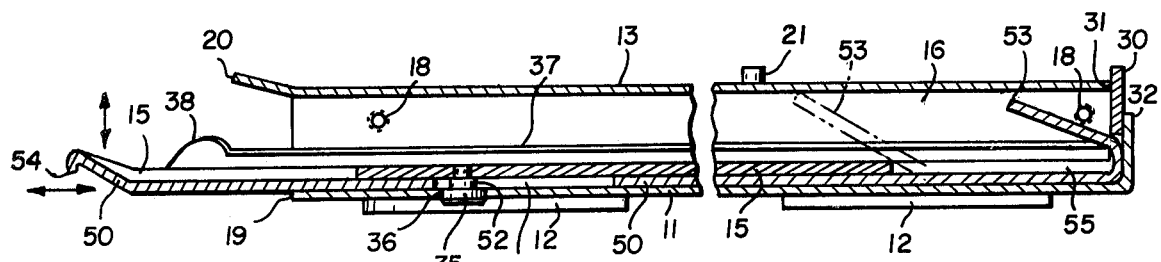
FIG. 2 is an enlarged cross-sectional view of the easel of FIG. 1, taken along the line 2—2 thereof.
Figure 3:
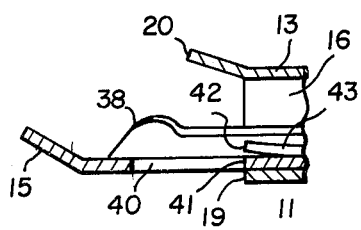
FIG. 3 is an enlarged, fragmentary cross-sectional view of the easel of FIG. 1, taken along the line 3—3 thereof.
Figure 4:
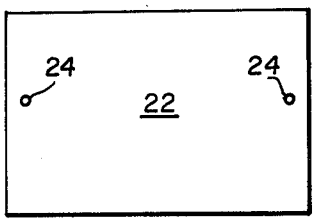
FIGS. 4 and 5 are reduced plan views of masking plates for the easel of FIG. 1.
Figure 5:
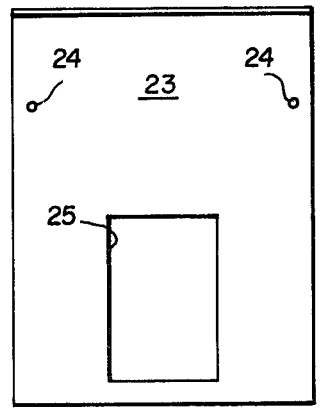

Base 11 is preferably formed of a sheet of metal and is generally flat with bent-up side edges 16. Mask 13 has a preferably centrally located printing aperture 14 and is also preferably formed of a sheet of metal with bent-down side edges 17. Screws 18 or other convenient fasteners interconnect side edges 16 and 17 to secure mask 13 parallel with base 11 and spaced above base 11. The front edge 19 of base 11 is preferably disposed to register with the trailing edge of a sheet of print paper in tray 15 as explained more fully below, and front edge 20 of mask 13 is preferably bent slightly upward as best shown in FIG. 2 and extends slightly outward beyond front edge 19 of base 11. Mask 13 also has a pair of pins 21 arranged on opposite sides of print aperture 14 to extend upward above the upper surface of mask 13. Accessory mask plates 22 and 23 of FIGS. 4 and 5 have holes 24 positioned to fit over pins 21 so that mask plates 22 or 23 can be positioned over mask 13 to reduce aperture 14 to predetermined desired dimensions for different sized prints. For example, mask plate 22 has holes 24 that are eccentrically positioned relative to its longer edges so that it can be oriented in two different ways on pins 21 for reducing the size of aperture 14 by an amount suitable for two different sized prints, depending on which way plate 22 is oriented on pins 21. Plate 25 is large enough to cover all of aperture 14, and has a reduced size aperture 25 for making even smaller prints. Many variations are possible in fitting different sized masking plates over mask 13 to achieve any desired print aperture size.

Print paper tray 15 is laterally slidable between a plurality of print positions arranged as desired between the right and left sides of easel 10, and a simple guiding device is used for accurately moving paper tray 15 between print positions. The back edge 30 of paper tray 15 is bent up at a right angle to the plane of the central region of tray 15, and bent-up edge 30 engages and slides along the back edge 31 of mask 13. Edge 30 of tray 15 is retained in engagement with edge 31 of mask 13 by a retainer 32 that is bent up at the back edge of base 11 to form an upstanding abutment perpendicular to the general plane of base 11. Retainer 32 is parallel with and spaced from back edge 31 of mask 13 and allows sufficient clearance for free sliding motion of back edge 30 of tray 15. Such an arrangement is simple to fabricate and assemble and is also smooth acting and reliable in keeping tray 15 accurately aligned with mask 13.

Tray 15 has a registration pin 35 extending downward below the underside of tray 15 and positioned near the front edge of tray 15 for registering tray 15 in each desired print position. Registration holes 36 are formed along the front edge of base 19 to receive pin 35 to register tray 15 for each print position desired. The illustrated embodiment has three registration holes 36 in base 11 for positioning tray 15 in three print positions, although different numbers of print positions are possible. Mask 13 is spaced sufficiently above base 11 to allow vertical movement of the front edge of tray 15 as schematically represented by the arrows in FIG. 2; and vertical pivoting of the front edge of tray 15 is allowed by the loose, sliding fit of back edge 30 between retainer 32 and mask edge 31. Lifting the front edge of tray 15 raises registration pin 35 up out of a registration hole 36 so that tray 15 can be slid sideways to a different print position where registration pin 35 drops into another registration hole 36 for accurately setting tray 15 in proper position for a print.

Tray 15 has side edges 37 that are bent inward at an acute angle to the plane of the central region of tray 15 for holding down side edges of a sheet of print paper flat against the bottom of tray 15. To facilitate insertion of a sheet of print paper under the bent-down side edges 37 of tray 15, edges 37 are bent gradually inward in the region 38 which they extend outward from the front edges of mask 13 and base 11. The gradual inward bending 38 of tray edges 37 occurs outward from front edge 19 of base 11 and under the upwardly bent front edge 20 of mask 13 so as not to interfer with vertical motion of the front edge of tray 15 for raising and lowering registration pin 35 from registration holes 36 in base 11. The flared open ends 38 of bent-down tray edges 37 afford a more open side edge slot for guiding the leading edge of a sheet of print paper in under bent-down side edges 37 as the print paper is slid into tray 15.

Tray 15 has a pair of oblong openings 40 that each have back edges 41 positioned to register with the trailing edge 42 of a sheet of print paper 43 that is fully inserted into tray 15. Openings 40 are large enough to receive the fingers or thumbs of the user sufficiently for tactilly sensing registration of paper edge 42 with aperture edge 41 as a clear indication that paper sheet 43 is fully seated in tray 15 and is abutting the bent-up back edge 30 of tray 15. The back edges 41 of apertures 40 also preferably register with front edge 19 of base 11 for enhancing the tactile sensation of registry between tray openings 40, paper edge 42, and base edge 19.

Tray 15 preferably carries a paper ejector slide 50 that is preferably formed of a relatively thin strip of metal disposed to slide along the underside of tray 15 above base 11. Slide 50 has a slot 51 that fits on and engages a reduced diameter neck portion 52 of registration pin 35 which holds slide 50 slidably against the underside of tray 15. Slot 51 is long enough to allow forward movement of slide 50 to the broken line positions shown in FIGS. 1 and 2.

Tray 15 has a cutout slot 55 near its back edge and extending into bent-up edge 30, and slide 50 has a back end 53 that is bent down at an acute angle to the plane of the central region of tray 15. Bent-down end 53 engages the back edge of a sheet of print paper that is fully inserted into tray 15 and holds the back edge of the print paper sheet down flat against the upper surface of tray 15 during printing. When slide 50 is pulled forward, back edge 53 slides the print paper sheet forward out of tray 15 sufficiently so that it can be readily removed by gripping its edges without requiring any finger contact with the flat surfaces of the print paper. A bent-down front edge 54 of slide 50 affords a convenient finger engagement for pulling slide 50 forward, and the front end of slide 50 preferably registers with the front edge of tray 15 when slide 50 is pushed all the way back down to position bent-down back edge 53 rearwardmost for allowing a sheet of print paper to be fully inserted into tray 15 into abutment with bent-up back edge 30.

Slide 50 is preferably positioned in the center of tray 15 so that bent-down back end 53 holds down the center of a sheet of print paper positioned in tray 15. This is also convenient for locating registration pin 35 at the center of tray 15. The proportions illustrated for easel 10 work well in practice; although different dimensions of trays, slides, masks, and print apertures can readily be used. Also, different materials and construction techniques can be used in practicing the invention.

We claim:
1. A multiprint easel comprising:
   (a) a base normally oriented horizontally to have a front edge, a back edge, and opposite side edges;
   (b) a mask secured to said base to be generally parallel with and spaced above said base, said mask having a printing aperture, a front edge, a back edge, and opposite side edges generally corresponding with said edges of said base;
   (c) a print paper tray disposed between said base and said mask and slidable to a plurality of print positions between said side edges of said base and said mask, said tray having a back edge, opposite side edges, and a front edge extending outward beyond said front edges of said base and said mask;
   (d) said back edge of said paper tray being bent up to engage and slide along said back edge of said mask for aligning said tray with said mask;
   (e) said back edge of said base being bent up to form a retainer parallel with and spaced from said back edge of said mask to engage and hold said back edge of said tray against said back edge of said mask;
   (f) said spacing of said mask above said base being sufficient relative to said tray to allow vertical movement of said front edge of said tray;
   (g) a registration pin secured to said tray to extend downward below the underside of said tray in the region of said front edge of said tray; and
   (h) said base having a plurality of registration holes positioned along said front edge of said base to receive said pin to locate said tray in said print positions relative to said mask.

2. The easel of claim 1 wherein said side edges of said tray in a region under said mask are bent inward at an acute angle to the plane of a central region of said tray to hold side edges of a sheet of print paper flat against said tray, and said side edges of said tray in a region outward from said front edge of said mask are bent gradually inward to said acute angle.

3. The easel of claim 1 including a pair of positioning pins secured to said mask on opposite sides of said printing aperture, and masking plates having holes positioned to fit said pins so said masking plates can be positioned over said mask for reducing the size of said printing aperture.

4. The easel of claim 1 wherein said tray has a finger access opening in the region of said front edge of said tray, and said opening has a back edge positioned so that a sheet of print paper pushed against said back edge of said tray has a front edge registered with said back edge of said opening for tactilly sensing full insertion of said paper into said tray.

5. The easel of claim 4 wherein said back edge of said opening is registered with said front edge of said base.

6. The easel of claim 1 including a paper ejector slide that is movable between said base and said underside of said tray, said ejector slide having a back end bent down at an acute angle to the plane of a central region of said tray and positionable at said back edge of said tray for holding down a back edge of a sheet of print paper in said tray, and said ejector slide being movable forward for pulling said print paper out of said tray.

7. The easel of claim 6 wherein said ejector slide has a slot engaging said registration pin for holding said ejector slide against said underside of said tray in the region of said front edge of said tray.

8. The easel of claim 6 wherein said tray has a finger access opening in the region of said front edge of said tray, and said opening has a back edge positioned so that a sheet of print paper pushed against said back edge of said tray has a front edge registered with said back edge of said opening for tactilly sensing full insertion of said paper into said tray.

9. The easel of claim 8 wherein said ejector slide has a slot engaging said registration pin for holding said ejector slide against said underside of said tray in the region of said front edge of said tray.

10. The easel of claim 9 including a pair of positioning pins secured to said mask on opposite sides of said printing aperture, and masking plates having holes positioned to fit said pins so said masking plates can be positioned over said mask for reducing the size of said printing aperture.

11. The easel of claim 10 wherein said side edges of said tray in a region under said mask are bent inward at an acute angle to the plane of a central region of said tray to hold side edges of a sheet of print paper flat against said tray, and said side edges of said tray in a region outward from said front edge of said mask are bent gradually inward to said acute angle.

12. The easel of claim 11 wherein said back edge of said opening is registered with said front edge of said base.

* * * * *